No. 891,945. PATENTED JUNE 30, 1908.
C. J. MUTHER.
MILLING MACHINE.
APPLICATION FILED MAY 31, 1906.

2 SHEETS—SHEET 1.

Witnesses:
Wm Geiger

Inventor:
Charles J. Muther
By Munday Evarts & Adcock
Attorneys

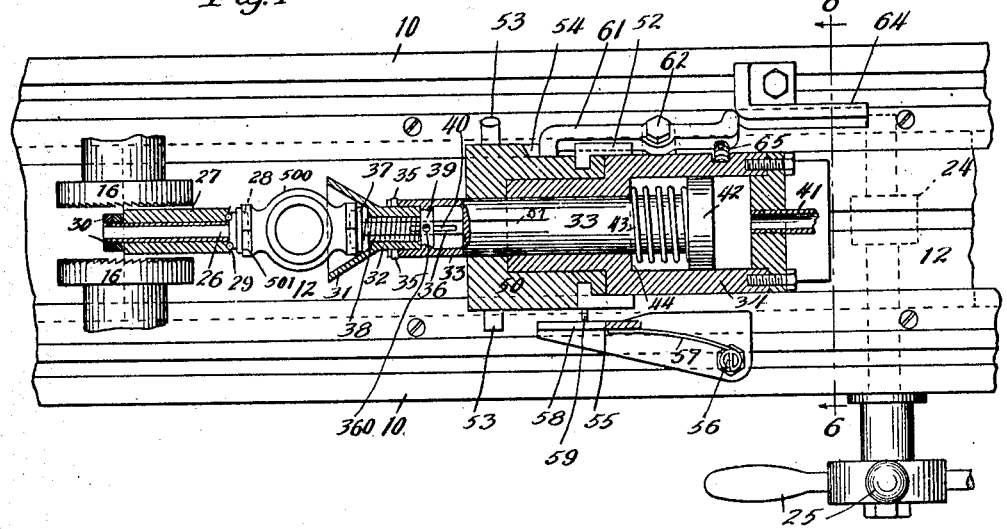

UNITED STATES PATENT OFFICE.

CHARLES J. MUTHER, OF CHICAGO, ILLINOIS.

MILLING-MACHINE.

No. 891,945.  Specification of Letters Patent.  Patented June 30, 1908.

Application filed May 31, 1906. Serial No. 319,477.

*To all whom it may concern:*

Be it known that I, CHARLES J. MUTHER, a citizen of the United States, residing in Chicago, in the county of Cook and State of Illinois, have invented a new and useful Improvement in Milling-Machines, of which the following is a specification.

This invention relates to the construction of a machine for milling brass and similar metals and is specially adapted to be used in the milling of square or hexagonal shapes. Its object has been to improve former constructions, and to produce a machine of a simple, efficient and durable type adapted to different kinds of work and also to operate upon different sizes of work.

Figure 1:
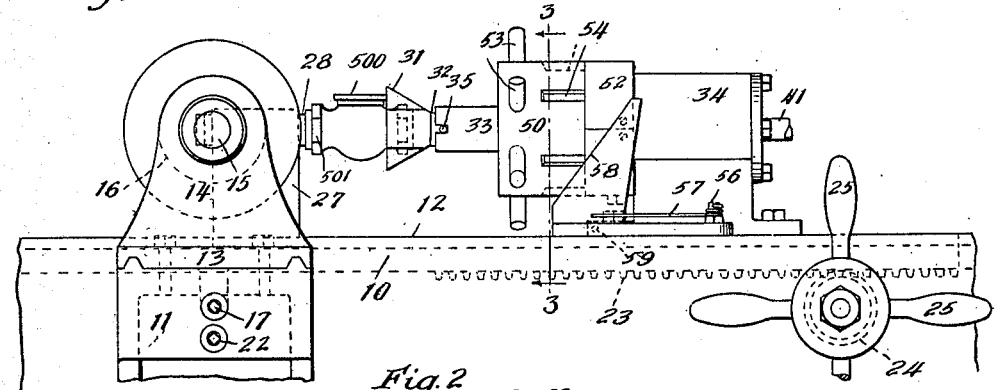
Figure 2:
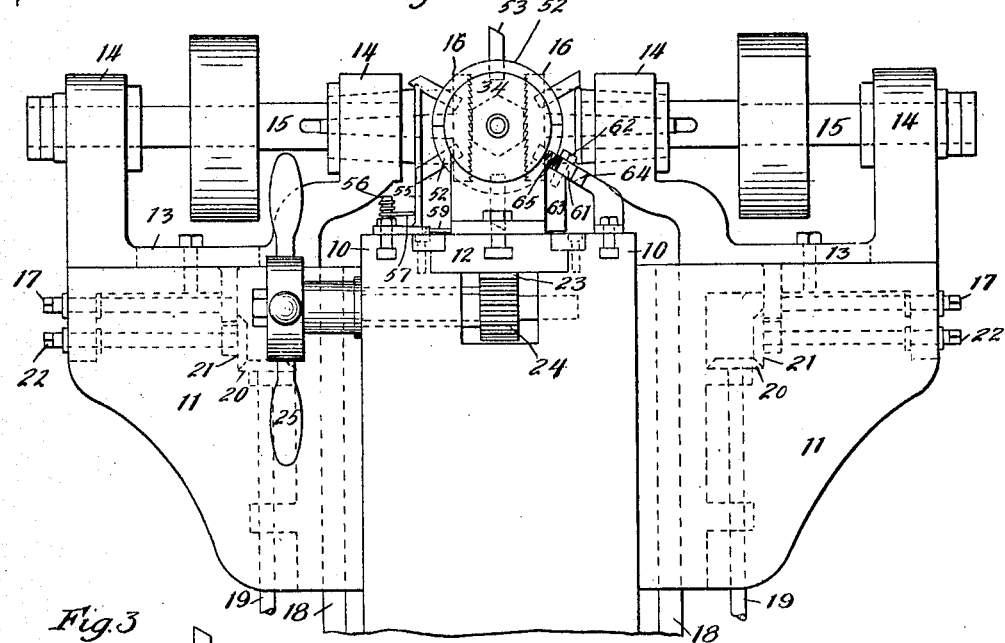
Figure 3:
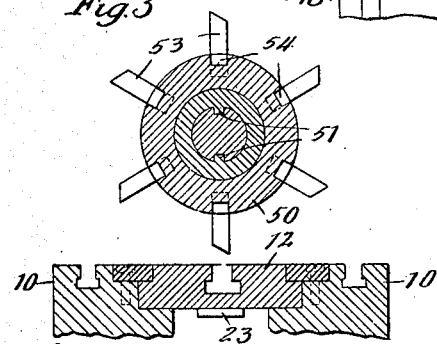

The nature of my improvements, as well as the details thereof are fully set forth below, and also illustrated in the accompanying drawing in which latter Figure 1 is a side elevation of the invention. Fig. 2 is an end elevation. Fig. 3 is a transverse section on the line 3—3 of Fig. 1. Fig. 4 is a horizontal section. Fig. 5 is an end elevation of the chuck employed in the machine. Fig. 6 is a section on the line 6—6 of Fig. 4. Fig. 7 shows a modified construction.

In said drawing, 10, 10 represent two bed or frame pieces arranged in parallel positions side by side and provided with laterally projecting brackets 11 11. A central longitudinally moving slide 12 travels on ways formed in the frames, and carries the devices by which the work is supported and by which it is positioned for different operations. On the brackets are frames 13 embodying bearings 14 for the journals 15 of the milling wheels 16, such frames being adjustable toward and from the work by screws 17 and the brackets are adjustable vertically on the ways 18 by the screws 19 operated by bevel pinions 20 and 21 and shaft 22. The slide 12 is provided with a rack 23 and is actuated by a pinion 24 meshing with the rack and the operating arms 25 mounted on the shaft of the pinion.

I have shown the machine as operating upon a familiar form of valve 500, having hexagons 501 at its ends to be milled by the machine. The forward end of the work is supported upon a spindle 26 having a bearing permitting it to turn in a standard 27 rising from the slide 12. The spindle has a head 28 at the end receiving the work, adapted to fit the opening in the valve and between such head and the standard a ball bearing may be provided as at 29. At its other end the spindle is provided with nuts 30 whereby it may be confined in its bearing. The spindle and the standard are both movable into operating position between the milling disks to subject the work to the disks. At the rear end, the work is supported by the following devices: At 31 is a bell having its mouth presented to the work, and made to conform to the work in shape. Thus in the case illustrated, it is six sided, and the work enters it and centers itself therein automatically. It is adapted to be used with work varying considerably in size. At its small end, the bell is provided with a straight tubular extension 32 which enters and is supported in the forward end of a plunger 33 arranged in line with the axis of the work and having its bearing in a cylinder 34 mounted upon the slide 12. The bell is keyed to the plunger by the pins 35 entered in notches in the end of the plunger so that it necessarily turns with the latter. A spindle 36 projects forwardly through the extension 32, and this spindle has a head 37 on its forward end adapted to enter and fit the rear opening in the work 500. This spindle is urged toward the work by a light spring 38 confined upon it between its head and an internal flange 39 in the plunger, and its movement through the bell is limited by the pin 360 passing through the slot 40 in the spindle and held in said flange 39.

The plunger 33 moves longitudinally in the cylinder 34, and is also free to turn therein. The longitudinal movements toward the mills are due to air under pressure admitted to the cylinder 34 through the pipe 41 and acting on the head 42 mounted on the end of the plunger and fitting the interior of the cylinder. By means of this air pressure the work is clamped between the spindles 26 and 36 with firmness during the milling operations. The pipe 41 is provided with suitable means for cutting off and releasing the air, but I have not thought it necessary to illustrate such means as their construction is well understood. In the other direction the longitudinal movements are due to the spring 43 encircling the plunger and confined thereon between the head 42 and the shoulder 44 formed on the interior surface of the cylinder 34. The pneumatic pressure overcomes this spring while the work is being done, but it is taken off, as explained below when the article operated on is completely finished or needs some change in position which the machine is not adapted to effect, and the spring then acts to retract the plunger, thus relieving the clamping action by which the work is held while being acted upon by the mills. The main slide is moved back after each operation to carry the work out from between the mills, and during these movements the bell and its accessory parts, which form in reality a chuck for the work, are turned a sufficient distance to present other sides of the work for the next milling operation. The means employed for thus turning the chuck are the following: Mounted upon the forward end of the plunger is a cap or turret 50. It is keyed to the plunger by long keys 51 so that it is adapted to turn the plunger in any relative position to which the latter may be moved by the air pressure or counteracting spring. The turret is locked to the cylinder 34 by two flanged half rings 52 which are fast to the cylinder and have their flanges inserted in a groove formed in the turret, but this attachment does not prevent the turret from turning. The turret is provided with radially projecting pins 53, which are equi-spaced, and the distance between them corresponds to the distance the work requires to be turned to present new surfaces for milling. It it also provided with a series of equi-spaced recesses 54 upon its periphery agreeing in number and in spacing with the pins. Upon one side of the side frames 10 is located a cam 55, pivoted upon a vertical pivot 56 and provided with a spring 57. The inclined edge 58 of the vertical portion of this cam is so placed that when the slide 12 is moved back at the completion of an operation, said edge will be encountered by the pins of the turret in their successive order in successive operations and said pins will be deflected by said edge. The turret will in this manner be turned the distance necessary to present fresh surfaces of the work for the next milling operation, and it actuates the plunger and the chucking devices to the same extent, so that the work is then prepared for the next operation. In order that full strokes or amounts of rotation of the turret may be insured and to permit the turret pins to move past the cam, I provide a device for swinging the latter upon its pivot 56 while the turret pins are riding on the incline 58, and this device consists of a pin 59 upon the slide 12 bearing against the edge 60 of the horizontal portion of the cam. This edge has a bend in it, and when the pin 59 reaches the bend, it swings the cam away from the slide and thus allows a full stroke or movement to the turret. The spring 57 opposes this swinging of the cam. The turret is locked against turning during the milling operations by a dog 61 pivoted at 62 upon a standard 63 rising from the slide 12. The dog is arranged longitudinally of the machine and one end of it is adapted to enter the slots or recesses 54 of the turret, thus locking the latter against turning, and the other end is arranged to encounter a cam 64 attached to the side frame 10 when the slide is retracted at the conclusion of a milling operation. The cam causes the dog to release the turret, and it is timed to do so just previous to the turning of the turret as above described. A spring 65 acts on the dog to force it into locking engagement with the turret, so that the dog is sure to enter the next succeeding recess 54.

The clamping and pressure by which the work is held during the milling, is ordinarily retained until all of the surfaces to be milled have been operated upon or until the work needs to be changed in some respect not provided for in the machine, and consequently in the back movements of the main slide other than those occurring at the finish or when such changes in position are necessary, the air pressure is not removed, but remains in force, so that the work does not lose its correct position in the chucking devices. The air pressure may be released at the last operation automatically by suitable mechanism which any good mechanic can apply, and it should also be releasable at any time by hand.

The operation of the machine is as follows: When the work has been placed between the spindles 26 and 36, the work centers itself in the bell mouthed chuck, and the air pressure is then admitted to the rear of the plunger and forces the latter forward, thereby establishing a firm clamp upon the work. The slide 12 is now advanced, carrying the work into position for the action of the mills. Upon the completion of the milling, the slide is returned sufficiently to carry the work out of the mills and in such movement the turret is turned so as to bring fresh surfaces into position for milling, and then the work is again advanced and the fresh surfaces acted upon. This operation is repeated as often as necessary for the work in hand, and at the final operation the air pressure is removed from the plunger, allowing the latter to recede from the work and thus relieve the severe pressure upon it and also allowing it to be removed from the machine. Preparatory to each turning movement of the slide, the turret is first unlocked as described above.

The modification shown at Fig. 7 is for doing what is known as center piece work. The plunger 70 is vertical and supported by an overhanging arm 71, which is vertically adjustable upon a removable bed block 72 mounted upon the slide 73. By changing the bed block, it will be noted that the plunger can be raised to any height rendered necessary by the work. In this construction, the plunger is made to clamp the work in the same manner as in the main figures, it being movably held in a cylinder 74 upon said arm 71, and having a head 75 acted upon by air under pressure from the pipe 76. It also has a retracting spring 77 and a flanged head 78 adapted to enter the opening in the work. The turret 79 is below the work and provided with a swiveling holder 80. The turning movements of the turret may be for measured distances, and a spring actuated stop 81 mounted on the slide 73 entering openings 82 formed in the turret will serve to secure the result, as well as locking the turret during the milling operations.

The cutting off and admission of the air pressure may be wholly automatic, and be effected by a stop or arm upon the main slide contacting with the valve mechanism of the air pipe in such manner as to open the valve and discharge the air when the slide moves back, and to close the valve and admit the air when the slide moves forward.

I claim:—

1. In a milling machine, the combination of rotatable opposing holders between which the work is clamped, one of said holders being stationary and the other being movable longitudinally, of pneumatic means for actuating the movable holder in clamping the work, said pneumatic means turning with said movable holder.

2. In a milling machine, the combination of rotatable opposing holders between which the work is clamped, one of said holders being stationary and the other being movable longitudinally, of pneumatic means for actuating the movable holder in clamping the work, and means for turning said pneumatic means.

3. The combination in a milling machine of rotatable opposing holders for clamping the work, one of the holders being stationary as to location and the other movable, and pneumatic means for actuating the movable holder in effecting the clamping, such pneumatic means being rotatable with the holders and about the same axis therewith.

4. The combination in a milling machine of opposing rotatable holders for clamping the work, one being stationary as to location and the other being movable, and a fluid pressure rotatable plunger arranged in the axial line of the holders and actuating said movable holder.

5. The combination in a milling machine, of rotatable opposing holders for clamping the work, one of the same being stationary and the other movable as to location, a fluid pressure plunger arranged in the axial line of the holders and actuating said movable holder, a slide carrying the holder and clamping device, a turret mounted on the plunger and serving as a means of turning the same and the movable holder, and means for actuating the turret in its turning movements.

6. In a milling machine, the combination with the millers, of a carriage or slide for moving the work up to the millers, and supports for the work mounted on said carriage or slide, said supports consisting of a stationary holder at one end of the work, a longitudinally movable holder at the other end, and a pneumatic plunger actuating said movable holder, said plunger being also mounted on the carriage, and the holders and plunger having the same axial line and being turnable about the same.

7. In a milling machine, the combination with the millers and the slide for moving the work to the millers, of rotatable opposing holders between which the work is clamped, one holder being movable toward the work to effect the clamping, a pneumatically operated plunger supporting the movable holder, a pneumatic cylinder in which the plunger slides and revolves, and a turret secured upon the cylinder and keyed to the plunger.

CHARLES J. MUTHER.

Witnesses:
  H. M. MUNDAY,
  EDW. S. EVARTS.